(12) United States Patent
Miyazaki

(10) Patent No.: US 6,685,330 B2
(45) Date of Patent: Feb. 3, 2004

(54) BACKLIGHT APPARATUS THAT CAN ASSURE UNIFORM BRIGHTNESS

(75) Inventor: Shingo Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/314,349

(22) Filed: Dec. 9, 2002

(65) Prior Publication Data
US 2003/0184992 A1 Oct. 2, 2003

(30) Foreign Application Priority Data
Mar. 26, 2002 (JP) ........................................ 2002-086894

(51) Int. Cl.$^7$ .............................................. G01D 11/28
(52) U.S. Cl. ............................................. 362/31; 362/27
(58) Field of Search ............................ 362/26, 27, 31, 362/346; 349/61, 62, 63, 65

(56) References Cited

U.S. PATENT DOCUMENTS 5,283,673 A * 2/1994 Murase et al. ................. 349/65
5,788,356 A * 8/1998 Watai et al. ................... 362/31
6,293,683 B1 * 9/2001 Okada .......................... 362/27

FOREIGN PATENT DOCUMENTS

| JP | 10-199316 | 7/1998 |
| JP | 10-199317 | 7/1998 |
| JP | 10-199321 | 7/1998 |
| JP | 10-283817 | 10/1998 |
| JP | 2000-29024 | 1/2000 |

* cited by examiner

Primary Examiner—Y. My Quach-Lee
(74) Attorney, Agent, or Firm—Staas & Halsey LLP

(57) ABSTRACT

A backlight apparatus includes a point light source, a linear light guide, a plane light guide, and a light shield unit. Rays of light radiated by the point light source travel through the linear light guide and the plane light guide, and are output to an illuminated object. The light shield unit shuts out a leaking fraction of rays of light that travels directly from the point light source to the plane light guide, thereby assuring uniform brightness of the output light.

7 Claims, 8 Drawing Sheets

BACKLIGHT APPARATUS THAT CAN ASSURE UNIFORM BRIGHTNESS

BACKGROUND OF THE INVENTION

1. Field of the Invention

The present invention generally relates to a backlight apparatus, and more particularly, to a backlight apparatus that uses a point light source to illuminate a liquid crystal display and so forth.

2. Description of the Related Art

Flat panel displays using liquid crystal panels are recently enjoying popularity as display devices for computer systems. Liquid crystal panels are also used for television systems. Television systems, however, require larger and brighter displays. Accordingly, backlight apparatuses for liquid crystal panels are desired to be brighter and of even brightness.

Generally, liquid crystal displays provided in notebook computers and mobile terminals have backlight apparatuses that illuminate liquid crystal panels from the back. FIGS. 1 and 2 are schematic drawings showing a conventional backlight apparatus 1 disclosed in Japanese Patent Laid-open Application No. 10-283817.

This backlight apparatus 1 includes two point light sources 2, a linear light guide 3, and a plane light guide 4. The point light source 2 is a light emitting diode (LED), for example. The point light source 2 is facing to the incident side face 7 of the linear light guide 3.

The linear light guide 3 and the plane light guide 4 are made of acrylic resin. The light emitted by the point light source 2 travels through the incident side face 7 to the linear light guide 3.

The light traveling through the linear light guide 3 is scattered in the linear light guide 3 and goes out to the plane light guide 4 through the outgoing face 8.

The linear light guide 3 is compatible with an electro luminescent lamp conventionally used to illuminate a liquid crystal panel since the entire portion of the outgoing face 8 of the linear light guide 3 illuminates, that is, the linear light guide 3 behaves as a linear light source. The combination of the point light sources 2 and the linear light guide 3 is preferable because it is less expensive and generates less heat than a conventional linear light source.

The plane light guide 4 is disposed on the back of the liquid crystal panel so that its outgoing face 10 faces the liquid crystal panel. This plane light guide 4 scatters the incident light from the linear light guide 3 through the incident side face 9 so that the light goes out evenly through the entire portion of outgoing face 10 and equally illuminates the entire portion of the liquid crystal panel. Accordingly, the liquid crystal panel is illuminated from the back by the backlight apparatus 1.

The backlight apparatus 1 further includes a first reflector 5 and a second reflector 6. The first reflectors reflects the incident light in the plane light guide 4 so that it does not go out through the side faces but only through the outgoing face 10. The second reflector 6 prevents the leakage of the incident light in the linear light guide 3.

In the case wherein two point light sources such as LEDs are used to reduce the cost of the backlight apparatus, a portion of the light emitted by the point light sources does not go into the linear light guide 3 but leaks since the emitted light spreads spoke-wise (the light will be referred to as the "leaking light" hereinafter).

On the other hand, as showed in FIG. 2, the point light sources 2 and the plane light guide 4 are disposed so closely that a portion of the leaking light enters the plane light guide 4 directly. An arrow 13 showed in FIGS. 1 and 2 indicates the leaking light directly traveling from the point light source 2 to the plane light guide 4. This leaking light goes to a region "A" and increases the brightness of the region "A". This degrades the uniformity of brightness.

SUMMARY OF THE INVENTION

Accordingly, it is a general object of the present invention to provide a novel and useful backlight apparatus by which one or more of the problems described above are eliminated.

Another and more specific object of the present invention is to provide a backlight apparatus that can ensure uniform brightness.

To achieve the above objects, a backlight apparatus according to the present invention is provided with a point light source that emits rays of light, a linear light guide that is provided by said point light source with said rays of light through an incident side face, diffuses said rays of light therein, and radiates said rays of light through an outgoing side face, said rays of light radiating through said outgoing side face being linearized, a plane light guide that is provided by said linear light guide with said rays of light through an incident side face, diffuses said rays of light therein, and radiates said rays of light through an outgoing face facing an illuminated object, and a light shield unit that prevents a leaking fraction of said rays of light from going directly into said plane light guide.

The leaking fraction of the rays of light is shut out by the light shield unit, and therefore cannot go into the plane light guide. Accordingly, the backlight apparatus according to the present invention can irradiate the illuminated object entirely at an equal brightness.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention will be described in detail below.

Figure 1:
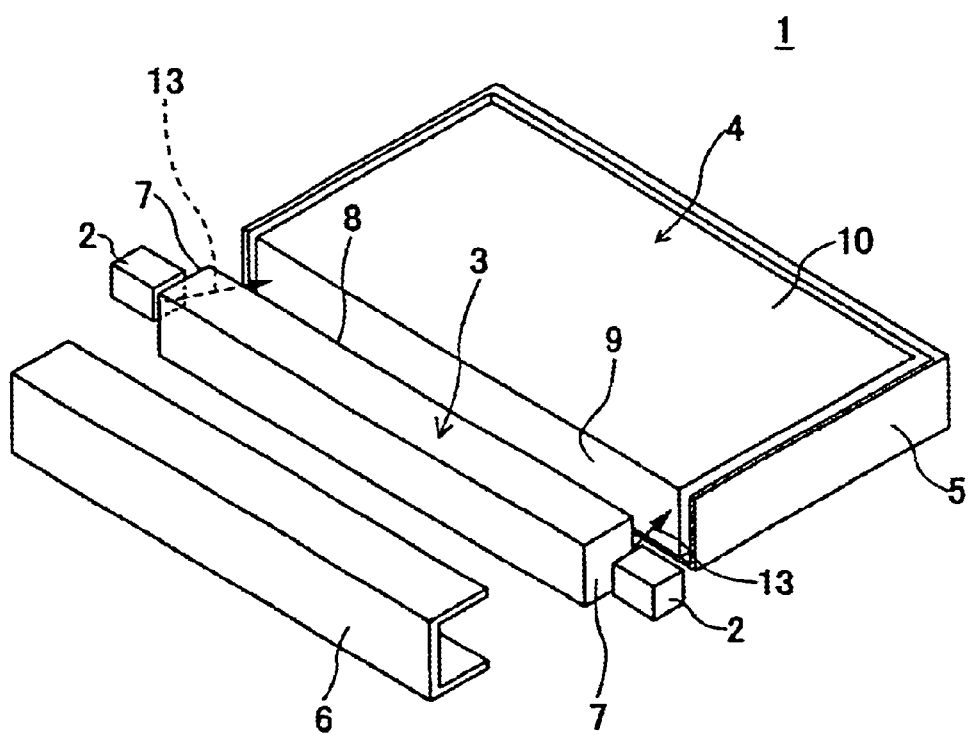
FIG. 1 is a perspective view showing a conventional backlight apparatus.
Figure 2:
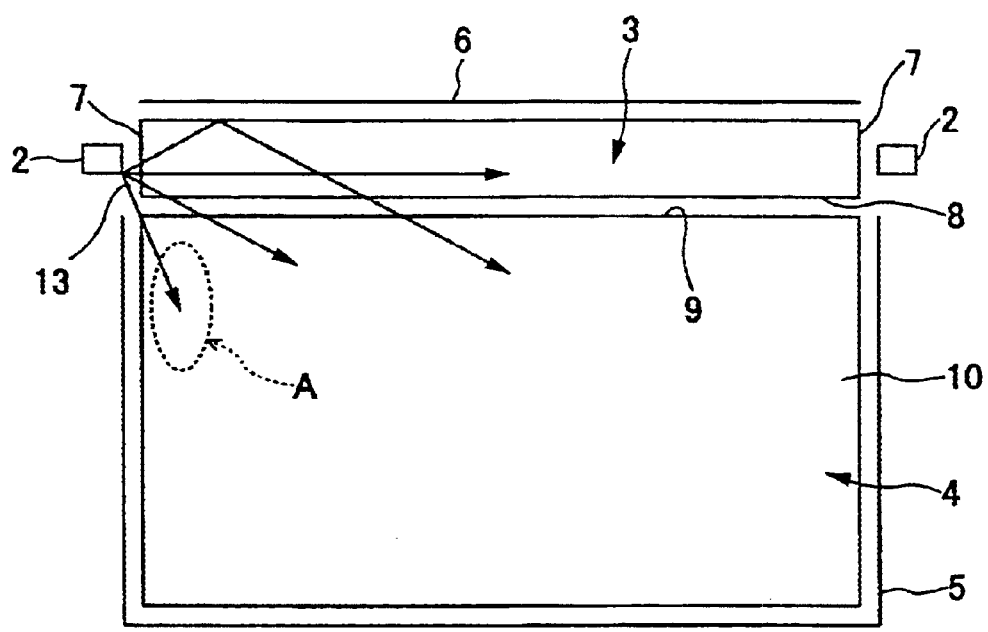
FIG. 2 is a schematic drawing showing the conventional backlight apparatus showed in FIG. 1.
Figure 3:
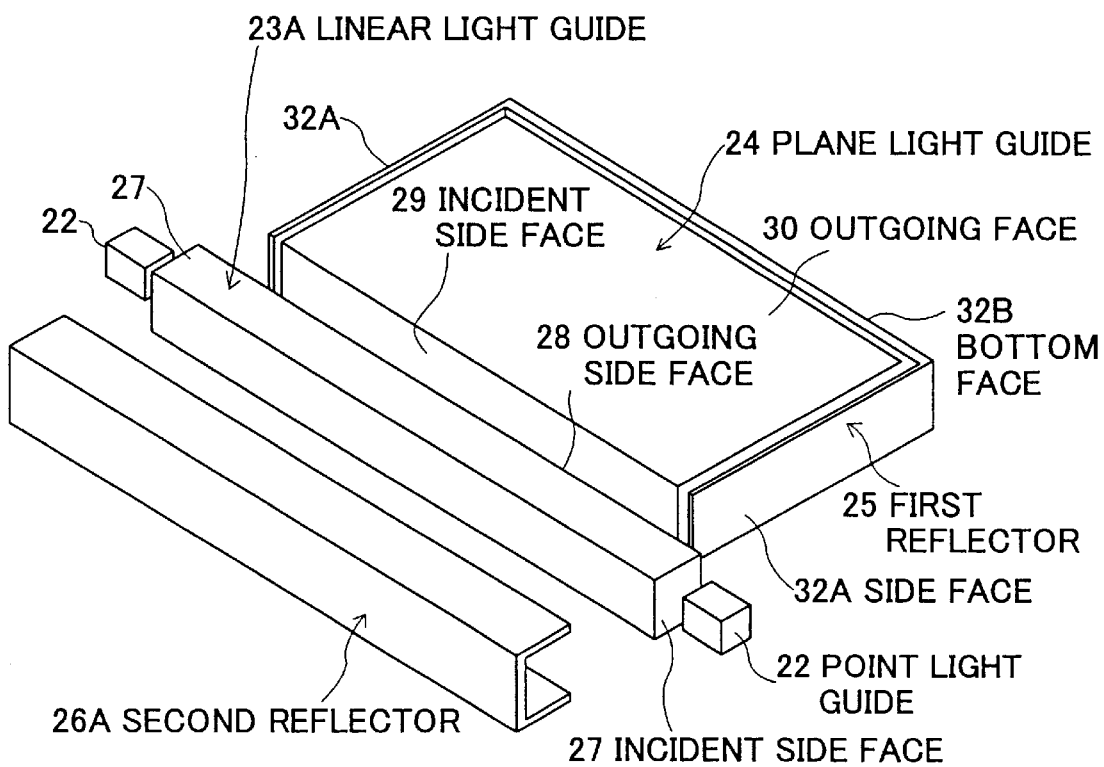
FIG. 3 is a perspective view showing a backlight apparatus according to the first embodiment of the present invention.
Figure 4:
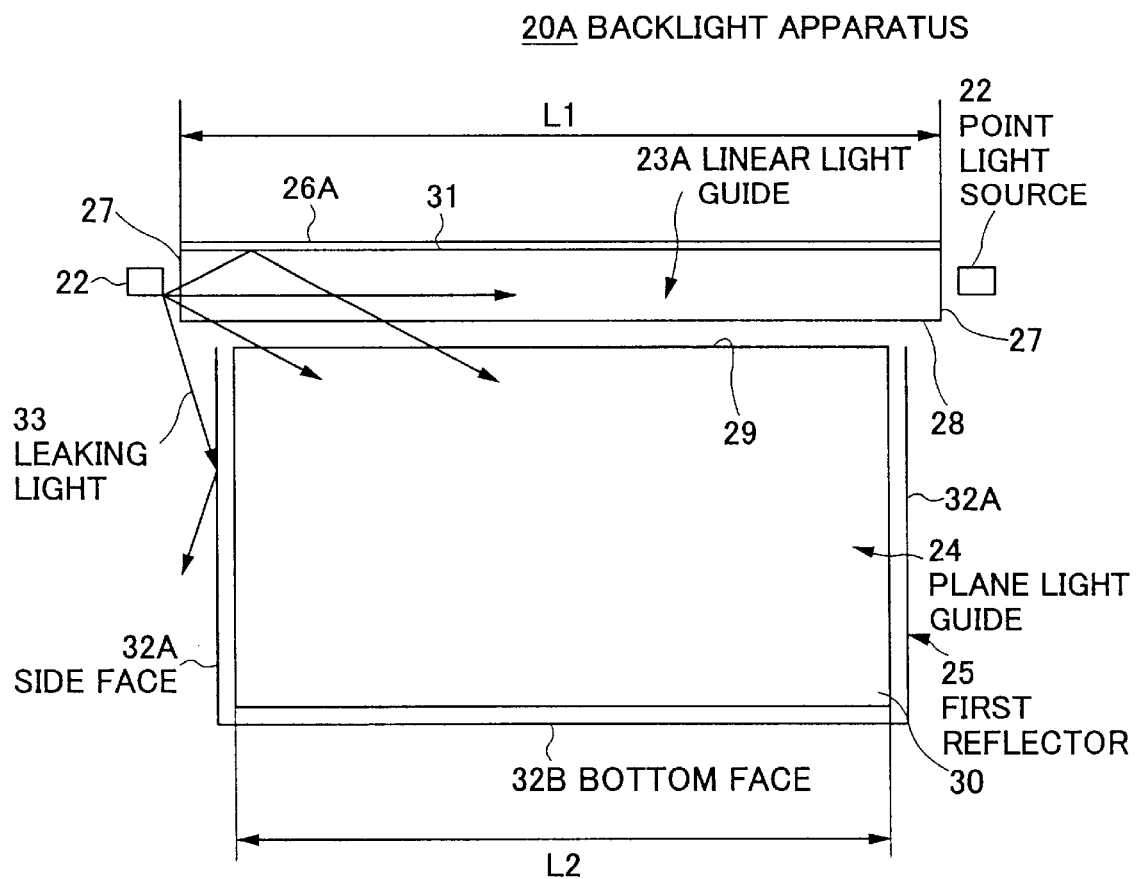
FIG. 4 is a schematic drawing showing the backlight apparatus showed in FIG. 3.

FIGS. 3 and 4 show a backlight apparatus 20A according to the first embodiment of the present invention. This backlight apparatus 20A is built in a liquid crystal display that is used for a notebook computer or a mobile terminal. The backlight apparatus 20A includes two point light sources 22, a linear light guide 23A, a plane light guide 24, a first reflector 25, and a second reflector 26A.

The point light source 22 is a light emitting diode (LED), for example, in which light is emitted from a small, point-like region. The point light source 22 is different in this respect from an electro luminescent lamp of which the light emitting portion is linear. Since the point light source 22 such as an LED is less expensive than a linear light source such as an electro luminescent lamp, the backlight apparatus 20A incurs less cost than that using a linear light source. Additionally, since the point light source 22 generates less heat than a linear light source, the backlight apparatus 20A does not require any structure for cooling.

In this embodiment, two point light sources 22 are provided to respective edges of the incident side face 29 of the plane light guide 24. If the area of the plane light guide 24 is small and the required brightness is low, one point light source 22 at an edge of the incident side face 29 would be enough.

The linear light guide 23A is a stick-shaped member having a rectangular cross-section made of transparent acrylic resin. An incident side face 27 facing a point light source 22 is formed at each end of the length direction of the linear light guide 23A.

The light beam emitted by the point light source 22 enters the linear light guide 23A through the incident side face 27. The light beam is scattered in the linear light guide 23A formed by transparent acrylic resin and exits the linear light guide 23A toward the plane light guide 24 through the outgoing side face 28. The light beam emitted by the point light source 22, however, spreads spoke-wise. As described above, a portion of the emitted light beam leaks and does not enter the linear light guide 23A.

A second reflector 26A is attached to the linear light guide 23A. The second reflector 26A in FIG. 3 is showed disassembled from the linear light guide 23A.

This second reflector 26A is made of metal material such as stainless steel, steel, or aluminum. The second reflector 26A is as long as the linear light guide 23A and covers all faces of the linear light guide 23A except for the incident side faces 27 and the outgoing side face 28.

A silver evaporated layer or a white reflective layer is formed on each surface of the second reflector 26A facing the linear light guide 23A so that the light beam is effectively reflected and scattered. Accordingly, the light beam becomes linear and uniform when it exits the linear light guide 23A through the outgoing side face 28.

The plane light guide 24 is made of resin of high transparency such as acrylate. This plane light guide 24 is disposed on the back of a liquid crystal panel (not showed). The outgoing side face 28 of the linear light guide 23A is positioned so that it faces the incident side face 29 of the plane light guide 24.

A first reflector 25 is provided to the plane light guide 24. The first reflector 25 is made of metal material such as stainless steel, steel, or aluminum and covers all faces of the plane light guide 24 except for the incident side face 29 and the outgoing face 30.

A silver evaporated layer or a white reflective layer is formed on the side faces 32A and the bottom face 32B of the first reflector 25 so that the light beam is effectively reflected and scattered. A reflective sheet (not showed) is provided between the back face of the plane light guide 24 (the face opposite to the outgoing face 30) and the first reflector 25.

This reflective sheet reflects the light beam from the plane light guide 24 back to the plane light guide 24. Accordingly, the incident light beam from the linear light guide 23A is reflected and scattered in the plane light guide 24. A light beam having substantially uniform brightness exits through the entire portion of the outgoing face 30 of the plane light guide 24 toward the liquid crystal panel.

It is worth paying attention to the lengths of the linear light guide 23A and the plane light guide 24. In the case of the backlight apparatus 20A showed in FIG. 4, the length L1 of the linear light guide 23A is greater than the length L2 of the plane light guide 24 (L1>L2).

Since the length L1 of the linear light guide 23A is greater than the length L2 of the plane light guide 24 (that is, the length of the incident side face 29), the point light source 22 and the plane light guide 24 are positioned apart. Accordingly, one can reduce the quantity of the leaking light 33 that enters the plane light guide 24 directly from the point light source 22, and improve the uniformity of brightness over the outgoing face of the plane light guide 24.

In addition to the above, the side face 32A of the first reflector 25 is positioned in the light path of the leaking light 33 between the point light source 22 and the plane light guide 24. As described above, the first reflector 25 is made of metal material such as stainless steel, steel, or aluminum that is not transparent.

Accordingly, one can assure that no leaking light 33 enters the plane light guide 24 directly from the point light source 22, and improve the uniformity of brightness over the outgoing face 30 of the plane light guide 24.

The first reflector 25 covers the entire side faces 32A and the bottom face 32B of the plane light guide 24. The first reflector 25 in this embodiment not only reflects the light beam in the plane light guide 24 (original function of the first reflector 25) but also shuts out the leaking light 33 directly from the point light source 22. Accordingly, one can reduce the size and the number of parts of the backlight apparatus 20A according to this embodiment.

A description of the second embodiment of the present invention will be given below.

Figure 5:
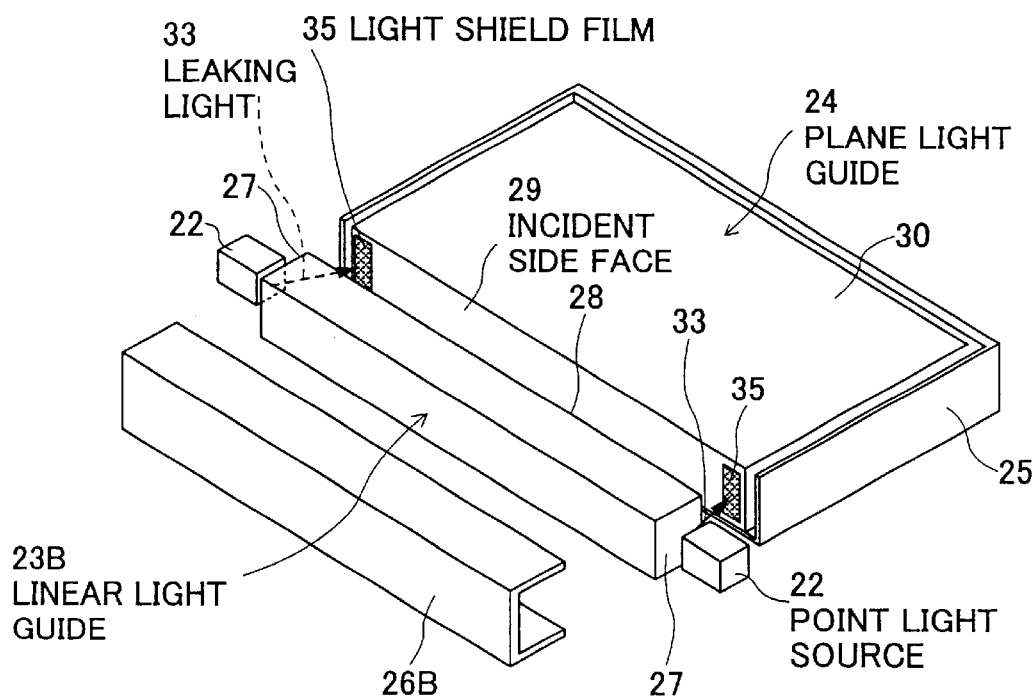
FIG. 5 is a perspective view showing a backlight apparatus according to the second embodiment of the present invention.
Figure 6:
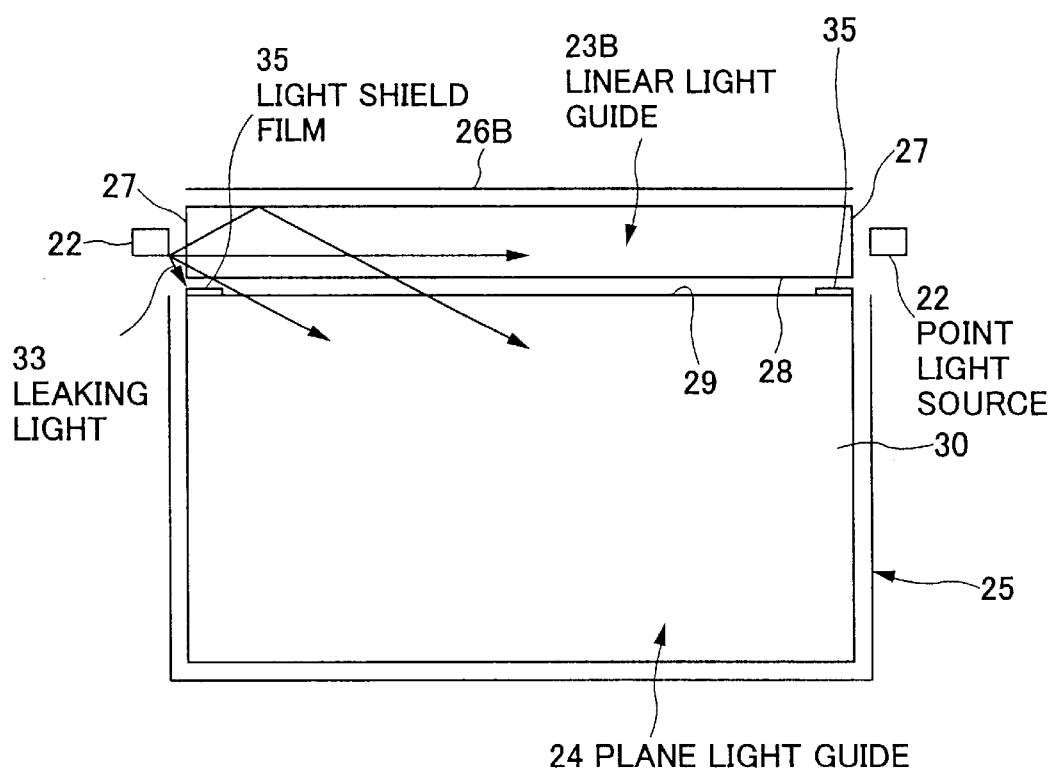
FIG. 6 is a schematic drawing showing the backlight apparatus showed in FIG. 5.

FIGS. 5 and 6 show a backlight apparatus 20B according to the second embodiment. Components that are identical to those described previously by reference to FIGS. 3 and 4 are referred to by the same numerals and their description will be omitted. The description of components showed in the other drawings to follow may be omitted in the same manner.

In the case of the backlight apparatus 20B according to this embodiment, the length of the linear light guide 23B is equal to the length of the plane light guide 24. The backlight apparatus 20B can be smaller than the backlight apparatus 20A if the same plane light guides 24 are used for both backlight apparatus. However, the backlight apparatus 20B suffers more from leaking light 33 than the backlight apparatus 20A.

This embodiment is characterized in that a light shield film 35 is provided on each side of the incident side face 29 of the plane light guide 24 so that the light shield film 35 shuts out the leaking light directly entering plane light guide 24 from the point light source 22.

The light shield film 35 may be made of whatever shuts out light such as metal film, resin film, or inorganic film. In the case of metal film, the light shield film 35 may be formed on the incident side face 29 by sputtering or adhering to. In the case of resin film, the light shield film 35 may be applied or adhered to the incident side face 29. In the case of inorganic film, the light shield film 35 may be adhered to the incident side face 29.

The above backlight apparatus 20B can eliminate the leaking light 33 that enters the plane light guide 24 directly from the point light source 22 as the backlight apparatus 20A does, and as a consequence, apply a uniform quantity of light through the outgoing face 30 of the plane light guide 24. Furthermore, the backlight apparatus 20B can be smaller than the backlight apparatus 20A according to the first embodiment, which is especially preferable for a mobile terminal.

The third embodiment will be described below.

Figure 7:
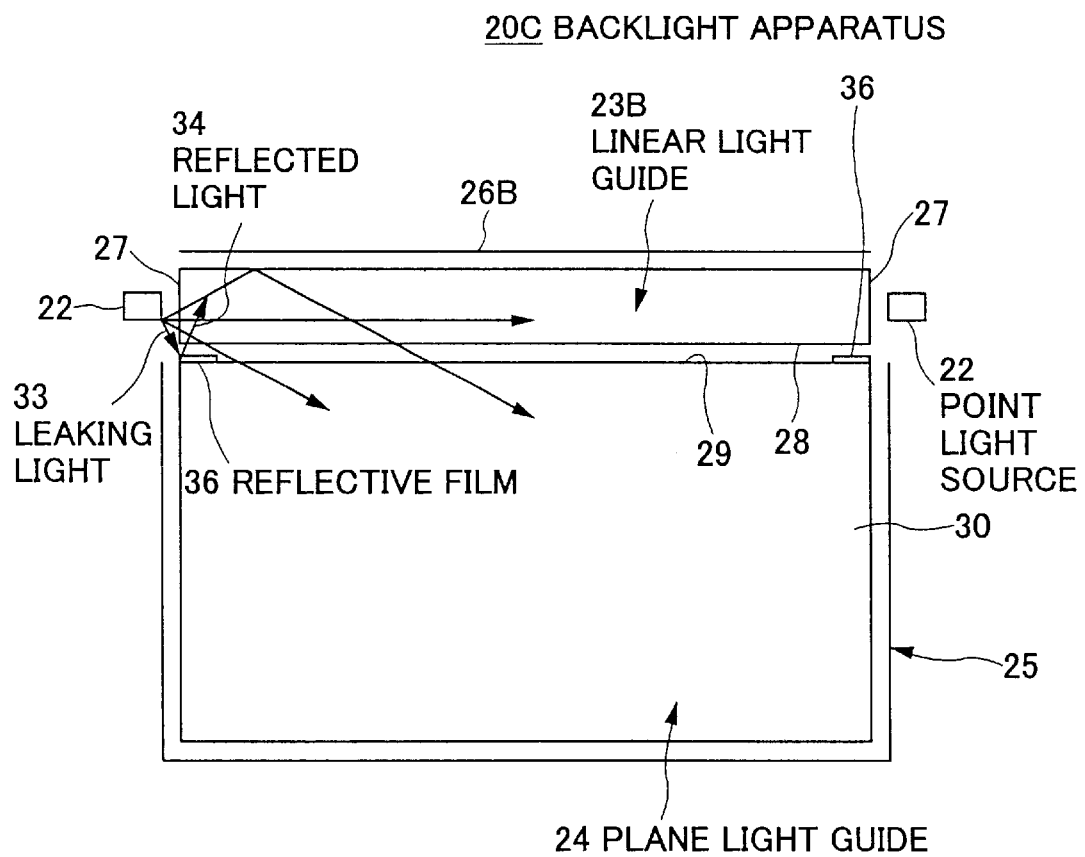
FIG. 7 is a schematic drawing showing a backlight apparatus according to the third embodiment of the present invention.

FIG. 7 shows a backlight apparatus 20C according to the third embodiment. The structure of the backlight apparatus 20C is substantially the same as the structure of the backlight apparatus 20B according to the second embodiment.

The backlight apparatus 20C is characterized in that it has a reflective film 36 instead of the light shield film 35 of the backlight apparatus 20B. The reflective film 36 has a mirror structure and not only shuts out leaking light from the point light source 22 but also reflects the leaking light to the linear light guide 23B. The reflective film 36 may be made of a metal film of which the surface is a mirror.

Since the backlight apparatus 20C is provided with the reflective film 36, the leaking light 33 does not enter the plane light guide 24. Accordingly, the brightness of the light that exits the plane light guide 24 remains uniform over the entire portion of the outgoing face 30. Additionally, since the leaking light 33 that is reflected by the reflective film 36 enters the linear light guide 23B, the light radiated by the point light source 22 is more efficiently used. One can thereby increase the brightness of the backlight apparatus 20C.

Lastly, the fourth embodiment will be described.

Figure 8:
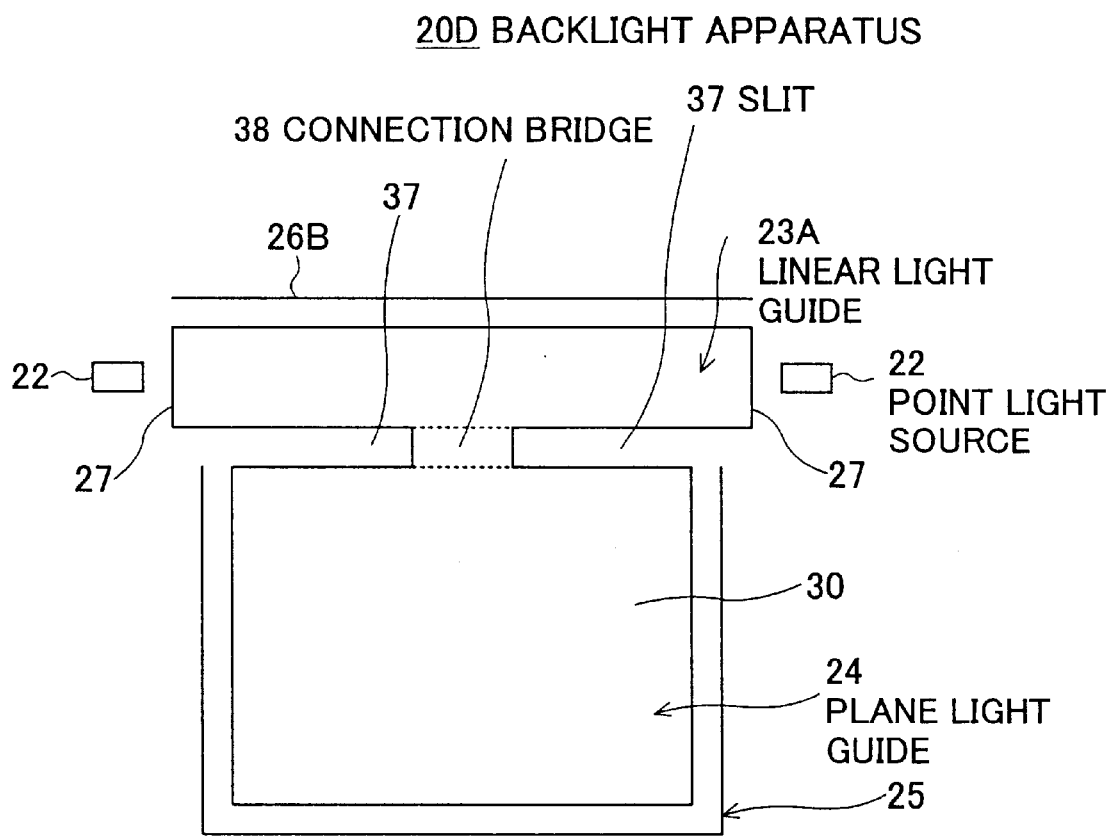
FIG. 8 is a schematic drawing showing a backlight apparatus according to the fourth embodiment of the present invention.

FIG. 8 shows a backlight apparatus 20D according to the fourth embodiment. The backlight apparatus 20D according to this embodiment includes the linear light guide 23A and the plane light guide 24 that are formed as a monolith. The linear light guide 23A and the plane light guide 24 are connected by a connection bridge 38, but the other portions are separated by slits 37.

As described above, since both the linear light guide 23A and the plane light guide 24 are made of transparent acrylic resin, it is not difficult to form the linear light guide 23A, the plane light guide 24, the connection bridge 38, and the slits 37 as a monolith at the same time by designing appropriate tooling that is used for molding.

This monolithic structure assures that the light radiated by the point light source 22 travels through the linear light guide 23A, the connection bridge 38, and the plane light guide 24. The light is more effectively scattered by the combination of the connection bridge 38 and the slits. Accordingly, the inequality in brightness is reduced. At the same time, one can improve the productivity of the backlight apparatus since the linear light guide 23A and the plane light guide 24 are formed as a monolith, compared to the other embodiments where the linear light guide 23A and the plane light guide 24 are formed separately.

In summary, according to an aspect of the present invention, a leaking fraction of rays of light is shut out by a light shield unit and does not go into the plane light guide. Accordingly, the backlight apparatus can assure uniform brightness of outgoing rays of light.

According to another aspect of the present invention, the point light source is positioned at a distance from the plane light guide, which reduces the quantity of leaking fraction of light that goes directly into the plane light guide from the point light source. Accordingly, the inequality in brightness is reduced.

According to yet another aspect of the present invention, a light shield member is provided in the path of the leaking fraction of light that goes directly to the plane light guide from the point light source. This light shield member completely shuts out the leaking fraction of light. Accordingly, the backlight apparatus can assure a more even (uniform) brightness in the outgoing rays of light applied to an illuminated object.

According to yet another aspect of the present invention, the reflector that is provided on the side faces and the bottom face of the plane light guide so that the light in the plane light guide does not leak through the side faces or the bottom face can be used as the light shield member. Accordingly, the size of the backlight apparatus can be reduced as well as the number of parts thereof.

According to yet another aspect of the present invention, since a light shield film is formed in the path of the leaking light, the backlight apparatus can eliminate the leaking light that goes directly into the plane light guide. Therefore, the backlight apparatus can output uniformly bright rays of light to the illuminated object through its outgoing face.

According to yet another aspect of the present invention, since the light shield is a mirror that reflects the leaking light so that the leaking light goes into the linear light guide, the backlight apparatus can not only assure uniform brightness, but also improve its brightness by using the light radiated by the point light source more efficiently.

If the linear light guide and the plane light guide are formed as a monolith and a connection bridge is formed by forming slits and leaving the connection bridge between the linear light guide and the plane light guide, the monolithic structure coupled with the above aspects of the present invention can assure more effective reduction in the inequality of brightness since the slits enhances the dispersion of the light. At the same time, the monolithic structure improves the productivity of producing the backlight apparatus compared to manufacturing the linear light guide and the plane light guide separately.

The preferred embodiments of the present invention are described above. The present invention is not limited to these embodiments, but various variations and modifications may be made without departing from the scope of the present invention.

This patent application is based on Japanese priority patent application No. 2002-086894 filed on Mar. 26, 2002, the entire contents of which are hereby incorporated by reference.

What is claimed is:

1. A backlight apparatus, comprising:
   a point light source that emits light;
   a linear light guide that is provided by said point light source with said light through an incident side face, diffuses said light therein, and radiates said light through an outgoing side face, said light radiating through said outgoing side face being linearized;
   a plane light guide that is provided by said linear light guide with said light through an incident side face, diffuses said light therein, and radiates said light through an outgoing face facing an illuminated object; and a light shield unit that prevents a leaking fraction of said light from going directly into said plane light guide.

2. The backlight apparatus as claimed in claim 1, wherein the length of said linear light guide is greater than the length of said plane light guide.

3. The backlight apparatus as claimed in claim 1, wherein said light shield unit is disposed in the path of said leaking fraction of said light from said point light source to said plane light guide.

4. The backlight apparatus as claimed in claim 3, wherein said light shield unit is a reflector that covers the side faces and bottom face of said plane light guide so that said reflector reflects light in said plane light guide not to leak from said plane light guide.

5. The backlight apparatus as claimed in claim 1, wherein said light shield unit is a film disposed in the path of said leaking fraction of said light from said point light source to said plane light guide.

6. The backlight apparatus as claimed in claim 5, wherein said light shield unit is a mirror that reflects said leaking fraction of said light from said point light source to said linear light guide.

7. The backlight apparatus as claimed in claim 1, wherein said linear light guide and said plane light guide are formed as a monolith; and a connection bridge is formed between said linear light guide and said plane light guide.

* * * * *